United States Patent [19]

Frost

[11] Patent Number: 5,041,972
[45] Date of Patent: Aug. 20, 1991

[54] METHOD OF MEASURING AND EVALUATING CONSUMER RESPONSE FOR THE DEVELOPMENT OF CONSUMER PRODUCTS

[76] Inventor: W. Alan Frost, Haddon House, 2-4 Fitzroy St., London, England, WIP 5ADE

[21] Appl. No.: 181,784

[22] Filed: Apr. 15, 1988

[51] Int. Cl.$^5$ .............................................. G06F 15/21
[52] U.S. Cl. ...................................... 364/401; 455/2; 358/84
[58] Field of Search ............... 364/401; 358/84; 455/2

[56] References Cited

U.S. PATENT DOCUMENTS

| | | | |
|---|---|---|---|
| 4,012,720 | 3/1977 | Call | 364/200 |
| 4,546,382 | 10/1985 | McKenna | 358/84 |
| 4,630,108 | 12/1986 | Gomersall | 358/84 |
| 4,658,290 | 4/1987 | McKenna | 358/84 |
| 4,775,935 | 10/1988 | Yourick | 364/401 |

Primary Examiner—Jerry Smith
Assistant Examiner—Gail O. Hayes
Attorney, Agent, or Firm—Pennie & Edmonds

[57] ABSTRACT

A method for evaluating consumer response comprising conducting interviews to obtain emotional, rational and personality descriptors of functionally related items, eliciting from consumers evaluations of the extent to which the non-eliminated descriptors are attributable to each item, creating a discrimination index of the evaluated descriptors whereby descriptors, which provide the most discrimination between items and which account for the greatest amount of behavioral variance over 70% among consumers, are identified as attributes, eliciting from consumers evaluations of the extent to which attributes are attributable to reference items and to given items, eliciting from consumers evaluations of a degree of preference for each given item, performing an independence factor analysis of the attributes in order to form clusters of related attributes, creating a multi-dimensional matrix for each use associated with given items wherein points representing reference items and given items are plotted based upon the attribute evaluations associated with each item, and determining the effect of a given change in an attribute evaluation for all consumers for a given item by measuring the relationships between the Euclidean distances between the points representing the items and reference items on the matrix and the degrees of preferences for the given items.

14 Claims, 7 Drawing Sheets

METHOD OF MEASURING AND EVALUATING CONSUMER RESPONSE FOR THE DEVELOPMENT OF CONSUMER PRODUCTS

BACKGROUND OF THE INVENTION

This invention relates to methods for performing marketing research which involve measuring and evaluating the responses of consumers or of the relevant audience to consumer products or other items which are to be marketed or presented to the audience, the members of which are in a position to choose between the items. The object of such methods is to determine how members of the audience will react to the introduction of new products to the market or to changes in the characteristics or image of an existing product. Marketing strategies can then be based upon the data obtained therefrom.

Such methods have applications in the field of marketing and advertising, where individual consumers are interviewed to obtain their responses to various consumer goods and services which are identified as having or being associated with certain traits and characteristics, i.e., attributes. Consumers heretofore have been presented with various existing goods and services, particularly proposed or new products being experimentally marketed, and interviewed to determine the extent to which they attribute these attributes to the products. This and other information about the consumers themselves, such as product usage patterns, demographic and personal data, history of trying new products, likelihood of purchasing proposed new products, and their evaluation of what and to what extent attributes would ideally be possessed by a product, have been evaluated in order to develop new and existing products having attributes which are desirable to consumers.

Such methods have also been used to measure and evaluate voter response to candidates for political office and political parties, platforms, ideas and policies, all of which for the purposes of these methods, can be considered products associated with various attributes and presented to a relevant audience for evaluation.

The information obtained from consumers can be stored in and evaluated by a computer. Such computers have been used to create models which simulate markets and market segments so that proposed new products or changes to existing products can be evaluated without engaging in the costly process of actual premarket testing to determine desirability or potential market share for each new product on each proposed change to a given product.

Several such marketing methods have been used commercially and have been described in marketing and business management journals. A variety of interviewing methods have been used to elicit information from consumers, including mall or shopping center interviews, telephone surveys and personal scheduled interviews in the home of the consumer, the place of business of the market researcher or other convenient location. These interviews have been open-ended, in that they invite any response the consumer might feel is appropriate or, alternatively, structured, in that the consumer is asked to choose among given responses. The interviews have also been qualitative, in that consumers are requested to identify appropriate attributes with respect to related items, or quantitative, where consumers are asked to evaluate the extent or degree to which such attributes describe the items or are otherwise attributable to the items.

Various combinations of open-ended, structured, qualitative and quantitative interviews have been used to elicit useful information from consumers for carrying out the market research or in creating a model for market simulation. Statistical analyses have been applied in various ways to this information in order to provide useful data concerning the marketing of the items.

The effectiveness of any market research method or simulation depends upon how closely that method approximates the actual market or market segment. Essential to the effectiveness and accuracy of any market research method is how the set of attributes, which are used in the quantitative interviews to measure and evaluate consumer response to items, is chosen. Some methods simply utilize the talent or expertise of the market researchers to choose what is believed to be an appropriate set of attributes. Descriptors of items have also been elicited directly from consumers from which attributes are chosen by eliminating the less appropriate descriptors through further interviews or various statistical analyses. For example, it is known that consumers do not make choices based upon a large number of attributes which may be obtained from consumer interviews or compiled by market researchers. Thus, known statistical methods such as factor analysis and cluster analysis have been used to group descriptors or attributes into factors which are intended to approximate the underlying constructs of consumer behavior. Attributes have then been chosen from each cluster or factor using a centroid or averaging method. Moreover, when such information has been obtained for the purpose of creating a model for market simulation, these methods are necessary simply to reduce the number of attributes and, therefore, variables to a workable level.

Other statistical methods such as discriminant analyses have been used to measure the degree to which certain descriptors can be used by consumers as attributes to discriminate between items. It is desirable, of course, to utilize data related to attributes which provide the greatest discrimination between all items so that the data obtained can effectively be used in the model or by the market researcher to accurately identify and predict consumer choices between items on the basis of new or changed attributes. These new or changed attributes are a key to developing new as well as existing products.

The appropriateness of a set of chosen attributes has been measured using known measures of behavioral variance generally applied in the behavioral sciences. The degree of behavioral variance displayed by a set of attributes is, among other things, an indication of the efficacy of the set, chosen by the market researcher, to provide the sample of consumers interviewed, which sample statistically represents the actual market or market segment, with the capability to explain their product choice. Prior to this invention, existing research methods have failed to construct the set of descriptors, including non-rational descriptors, necessary to perform a complete analysis. In general, mainly rational descriptors have been used. In some instances, a small number of non-rational descriptors have been selected, but never in structured sets that have been measured for analytical completeness when used in concert with rational descriptors. This unstructured approach was ineffective to obtain the levels of behavorial variance that are achieved by the present invention.

There has been no systematic method in the prior art for development and use of non-rational descriptors, which are a key component for explaining the highest levels of behavorial variance in accordance with the principles of the present invention. Thus, existing market research methods and model simulations have never been able to achieve a consistently higher behavioral variance level than 70%.

SUMMARY OF THE INVENTION

The method of the present invention provides a solution to the problem of selecting a set of attributes for use in market research which achieves a behavioral variance of greater than 70% and, as demonstrated, over 90%, and which also provides the highest level of discrimination for each consumer interviewed.

In the method of this invention, consumers are presented with a group of related items in qualitative, open-ended interviews and requested to identify words or phrases which describe each item. The building of sample groups of consumers and structuring of interviews can be accomplished by any of various techniques known in the marketing or behavioral sciences. In a given study, the items are usually functionally related, such as automobiles, shampoos, laundry detergents or breakfast cereals, and are usually identified by brand name. Other items which can be evaluated are those which serve a common function, for example, a fragrance, which is included as part of or an ingredient of different finished products, for example, deodorants, shampoos, or soaps, which are offered to consumers.

Using various qualitative interviewing techniques, consumers are requested to identify (1) rational descriptors, which describe the items in terms of function or physical characteristics, and (2) emotional descriptors, which describe the emotional reasons which the consumers have for choosing an item such as, for example, status, feelings of trust in the brand or product, association with warmth or goodness, and which include (i) stereotype descriptors, which consumers use to describe the demographic traits of users of the items and (ii) personality descriptors which consumers use to personify brands or items.

The descriptors obtained in the above enumerated three areas are usually 1000 to 2000 in number which number is initially reduced by various known qualitative interviewing techniques to reduce the number of descriptors, usually to approximately 100 to 200, thereby enabling the subsequent application of statistical analyses to further reduce such numbers.

The descriptors remaining after the initial reduction are then submitted in quantitative interviews to consumers, in association with the items, wherein consumers are requested to evaluate the extent or degree to which each descriptor presented to him is attributable to each item presented to him in the interview. Evaluations are obtained for all remaining descriptors and for all items overall, although all items and all descriptors preferably are not presented to each consumer in the interviews. The preferred method of quantitative interviewing is the SCRIBE computer aided interview, available from Frost International Research, whereby consumers are shown a monitor listing various items and are requested to cause a cursor or other indicator, using a hand-held control, to move along a line visually representing a linear scale of the degree or extent to which a descriptor describes, is associated with or is otherwise attributable to each item. The process is repeated among a sample of consumers, built according to any standard statistical method. All data is preferably not presented to each consumer, as pointed out above, but each item is evaluated sufficiently with respect to each descriptor so that the data is sound and within generally accepted confidence levels.

A discriminant analysis of the set of descriptors is performed. A discrimination index is thereby formed wherein each descriptor is assigned a value which represents the extent to which that descriptor discriminates between items among all of the consumers interviewed. The evaluated descriptors are then ordered according to their respective ranks in the discrimination index. The final set of attributes to be used in the final quantitative interviews are chosen from the descriptors on the bases of rank in the discrimination index and ability to provide the greatest degree of behavioral variance and usually number between 30 and 50.

In combination with the initial elicitation of each of the three types of descriptors as previously discussed, this simultaneous evaluation of potential attributes by means of these two essential and competing criteria, comprehensiveness with respect to providing the greatest number of consumers interviewed with the attributes necessary for them to identify the greatest degree of distinction between the greatest number of items, and the least amount of redundancy of attributes, has enabled the method of the present invention to achieve accurate and validated results with substantially greater than 70%, and up to 95%, behavioral variance among interviewed consumers.

The final set of approximately 30 to 50 attributes is then presented to consumers in conjunction with items. In quantitative interviews, consumers are requested to evaluate the extent to which each attribute is attributable to each item. Also elicited from the consumers is the extent to which each attribute is attributable to ideal items or to one or more other reference items related to each use. These interviews are preferably conducted using the SCRIBE method and in the same manner as the quantitative interviews conducted for the purpose of evaluating the descriptors and choosing attributes, as discussed above. During these final interviews, consumers are also requested to express a degree of preference for each item, which can be expressed as a preference for one item relative to the others, or as a degree of likelihood that the consumer would choose or purchase the item.

An independence factor analysis is performed on the attributes in order to group them into clusters of related attributes.

A point representing each item and each reference item is then plotted on a multi-dimensional matrix of factors, based upon the attribute evaluations for each respective item and reference item. The relationships between the points representing the items is best represented (1) by the Euclidean distance across hyperspace between these points, respectively, and the points representing the reference items on the matrix and (2) by a comparison of those distances to the expressed preference for the items or reference items. These comparisons are made among attributes within a factor as well as among factors.

Where only one reference item for each use is used in an analysis, for example, a theoretical ideal item for which consumers are requested to evaluate the extent to which each attribute would ideally be possessed by that item, each attribute is weighted by performing a squeeze analysis of the attributes so that the Euclidean distances between the points on the matrix representing each item and the ideal or other reference item inversely correspond to the expressed preference for or likelihood of purchasing the respective item. These attribute weights indicate the relative contribution of the attribute to each consumer's choice or purchase decision. An elasticity curve is preferably thereafter calculated whereby the attribute evaluations for each consumer interviewed are further weighted on the basis of the propensity of that consumer to change his or her choice or purchase decision between each set of adjacent items on the curve, having the next greater or lesser degree of preference as indicated by that consumer. These propensity weights are proportionate to the slope of the portion of the elasticity curve falling between the points representing such adjacent items.

The elasticity curve and the propensity weights defined thereby are useful to predict changes in purchase decisions caused by a given change in the degree to which an attribute is possessed by a given item, for example, a 10% increase or decrease is assumed for a given attribute on a given item.

Correlations between attributes are also measured so that when such a given change is calculated for one attribute, the resulting concomitant adjustments in all other attributes are also measured in accordance with such correlations.

These changes in attributes are then weighted in two respects, first, by multiplying such changes by the importance weight assigned to each attribute and, secondly, by multiplying such changes by the propensity weight assigned to each consumer. The attribute evaluations obtained originally from the consumer interviews are now increased or decreased by the positive and negative weighted changes in the attributes, as the case may be, in order to establish a new set of assumed attribute evaluations resulting from the given change in an attribute. This new set of assumed attribute evaluations is useful to predict new purchase decisions or preferences that will result if the given change in an attribute is implemented. This end product is extremely valuable to the marketing of products to consumers, particularly in view of the capability of the method of this invention to achieve an accuracy of up to 95% explanation of behavioral variance.

Where, for example, the items being evaluated are functionally related ingredients or parts of other items over which consumers directly exercise choice, a plurality of reference items is preferably used in the evaluations. In evaluating items such as fragrances, for example, a set fragrance notes is developed which is sufficient for a perfumer to identify a spectrum of fragrances, based on preparation and composition thereof, appropriate for a given use, i.e., incorporation in finished products such as shampoos, detergents or antiperspirants. Reference fragrances are created to correspond to the notes and are used in the method as reference items. Attribute evaluations associated with the reference items are then used to plot points representing the reference items on a multi-dimensional perceptual map. Attribute evaluations associated with existing or proposed new items, such as fragrances, used in a series of related products, are then used to plot points representing the existing or proposed new items on the perceptual map. The relationships between the points representing these items, and the points representing the reference fragrances on the perceptual map, are then evaluated with respect to the indicated degrees of preference for the respective reference items. The preference for a new product incorporating a given item, or the change in preference for an existing product which is modified by incorporation of a different ingredient item, can be measured by the change in location of the points on the perceptual map representing the aggregate attribute evaluations of those items, relative to the points representing the reference items.

BRIEF DESCRIPTION OF THE DRAWINGS

FIG. 4b illustrates the effect of a squeeze analysis of the attributes on the multi-dimensional matrix, here depicted with the two attributes or dimensions of FIG. 4a.

DESCRIPTION OF THE PREFERRED EMBODIMENTS

A need for marketing research is identified where a new product is sought to be introduced to the market or where the characteristics or image of an existing consumer product, goods or services, are sought to be changed, usually for the purpose of gaining a larger share of the market. The market research method is designed to predict the potential market share of a proposed new product or the change in market share of an existing product as a result of a given change in the image or in one or more characteristics of the product.

The item which is sought to be introduced or modified is first identified with a group of functionally related items, such as automobiles, laundry detergents, cleaning solutions or other packaged personal or household items, usually defined by competition among items in the group. A relevant market or audience is identified and samples thereof are built in accordance with generally accepted statistical methods.

The example used hereinafter to describe the first preferred embodiment involves a method for the development of automobiles as consumer products. The choice of this example is for convenience of describing the invention, and it should be recognized that the method of the invention and this particular embodiment can be used to conduct research with respect to any of a vast array of consumer goods and services.

The first overall step in the methodology is the identification and selection of the set of attributes with which the interviewed consumers will evaluate the items. The items are presented to members of the relevant audience, usually consumers who have expressed a potential, or have been otherwise identified as having a potential, to purchase a product, in open-ended, qualitative interviews wherein rational, functional, emotional, brand personality and user stereotype descriptors attributable to these products are elicited from the consumers.

The number of the elicited descriptors is then reduced in further qualitative interviewing using any combination of known techniques which are effective to identify descriptors which have the same meaning to consumers as other descriptors, or are redundant. These techniques preferably include so-called game-playing techniques, wherein consumers try to suggest a given product using attributes. The redundant descriptors are eliminated from consideration as attributes and will not be used in the quantitative interviews.

The next step in choosing a set of attributes involves a series of quantitative interviews conducted for the purpose of further reducing the number of descriptors by statistical means, using dual criteria of discriminating ability and non-redundancy of the descriptors.

Figure 1:
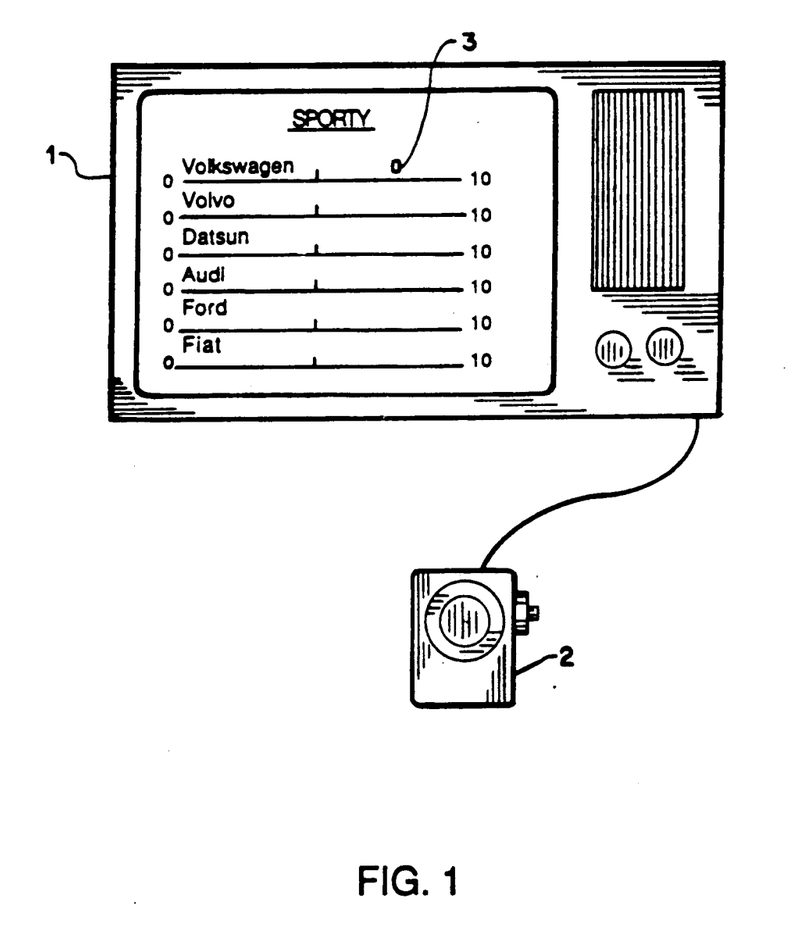
FIG. 1 shows a monitor and hand-held control used in the Sandpiper/SCRIBE computer aided interviewing technique and displaying information used in quantitative interviews in the method of this invention to elicit evaluations of descriptors.

A computer aided interviewing technique designed for use with the SCRIBE market modeling system, which is available from Frost International Research, is utilized in these quantitative interviews. FIG. 1 depicts the SCRIBE equipment used. Six automobile brands are listed from the group of items being evaluated and are displayed on the monitor 1. Each brand appears in conjunction with a continuous, linear attribute scale ranging from 0 to 10. At the top of the screen appears the non-eliminated descriptor, "sporty." Both the descriptor and the list of items are randomly chosen by the computer for presentation to the interviewed consumer, each item being evaluated with respect to each descriptor by the completion of the series of interviews. Using a hand-held control 2, the consumer causes a cursor or other symbol 3 to move horizontally along the attribute scale and then causes the computer to record the final location of the symbol 3 on each attribute scale and, therefore, for each item with which he is presented, repeating the process until these items have been evaluated with respect to all attributes which the computer has randomly presented to him. The computer records the final location of the cursor 3, as indicated by the consumer, on a scale from 0 to 100, thus increasing the resolution of the scale presented to the consumer by tenfold.

The data obtained from these interviews, in the form of attribute evaluations for each consumer for each item, are used to create a discrimination index of the evaluated descriptors whereby each descriptor is assigned a value representing its ability to distinguish among items for all consumers. Typically, three to five descriptors which have the highest discrimination are initially considered for inclusion in the attribute set. Attributes, preferably numbering between 30 and 50, are then chosen from the set of descriptors which provide high levels of behavioral variance and from other significantly-discriminating evaluated descriptors, using the dual criteria of discrimination and behavioral variance. None of the descriptors are eliminated from consideration in the initial stages. Rather, the process of choosing the attributes may involve repetitive addition and deletion of attributes in several passes. The final set of attributes chosen is comprised of the smallest number of attributes which will achieve the highest level of behavioral variance greater than 70% and, preferably, 90% or greater, which will provide each consumer with the attributes necessary to maximally discriminate between the greatest number of items, limiting redundancy among the attributes to a minimum.

Figure 2:
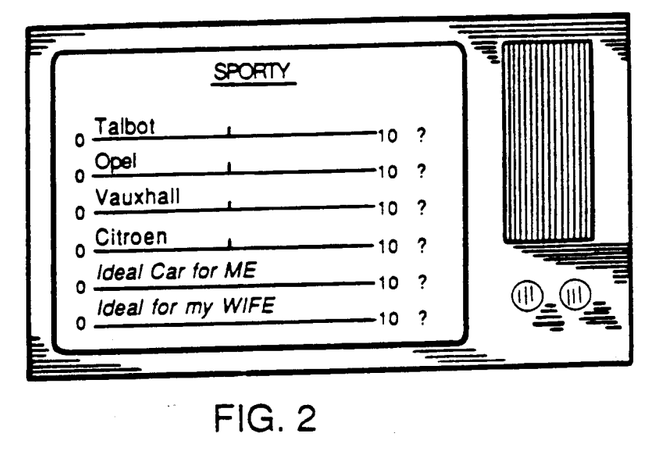
FIG. 2 shows the monitor of FIG. 1, displaying information used to elicit attribute evaluations of items and reference items.
Figure 3:
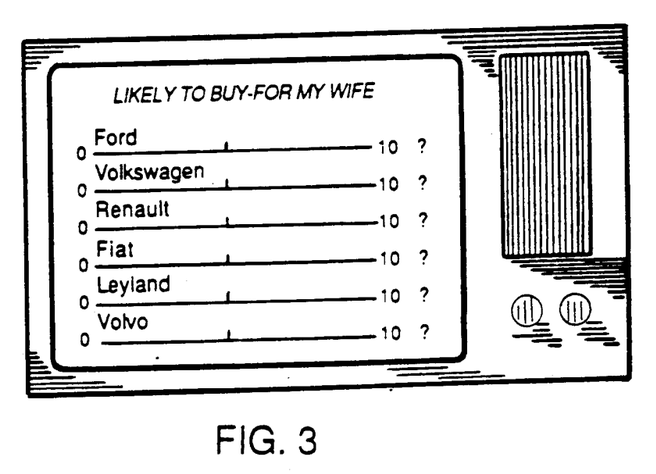
FIG. 3 shows the monitor of FIG. 1 displaying information used to elicit evaluations of the preference for or likelihood of purchasing items for a particular use.

The final set of chosen attributes are then submitted to consumers in quantitative, structured interviews, wherein attribute evaluations are elicited from consumers and recorded. The interviews are conducted utilizing the SCRIBE computer aided interviewing technique depicted in FIG. 2. Attributes, rather than descriptors, are now presented to the consumers for evaluation in association with the existing or given items, in this case, automobile brands, as well reference items which are the perceived ideal cars for particular uses, in this case, for use by the consumer being interviewed and by another family member, such as a spouse. In FIG. 2, the word, "sporty," again appears at the top of the screen, having been chosen from among the descriptors to become an attribute. FIG. 3 shows the screen of the SCRIBE monitor where evaluations of degree of preference for each item, in this case likelihood of purchasing, are elicited. All of this data, as well as an indication of which items the consumer would consider purchasing, notwithstanding his expressed degree of preference for all items, and other personal and demographic data which may be elicited in qualitative portions of the interviews, are evaluated in this preferred embodiment by means of the statistical analyses described below.

An independent factor analysis is performed on the attributes in order to group them into clusters of related attributes based upon their similarity in distinguishing between items.

Figure 4A:
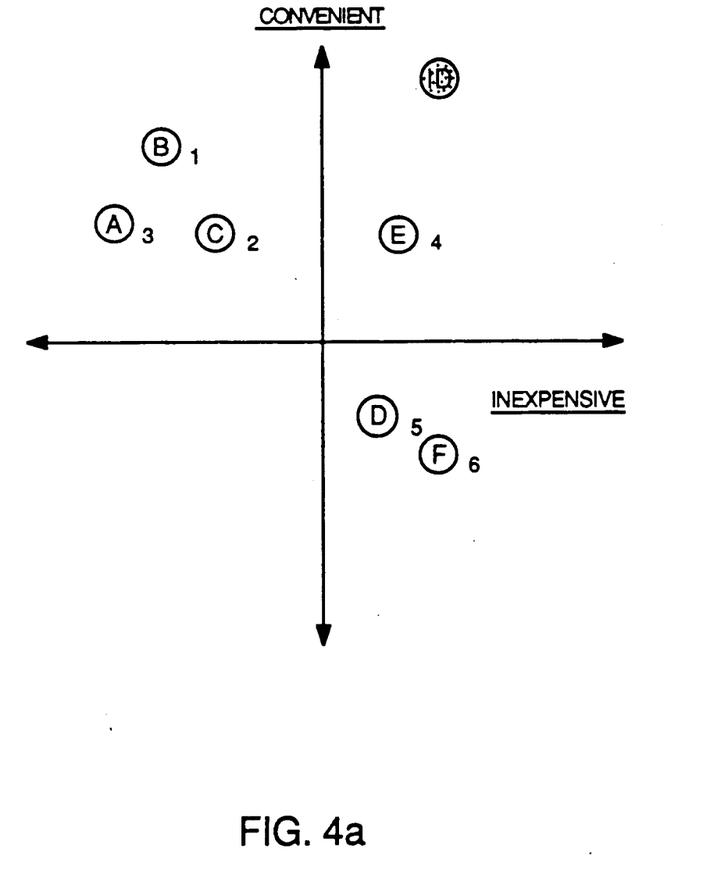
FIG. 4a shows the relative positions of points representing items and an ideal item with respect to two attributes, or in two dimensions, of the multi-dimensional matrix.
Figure 4B:
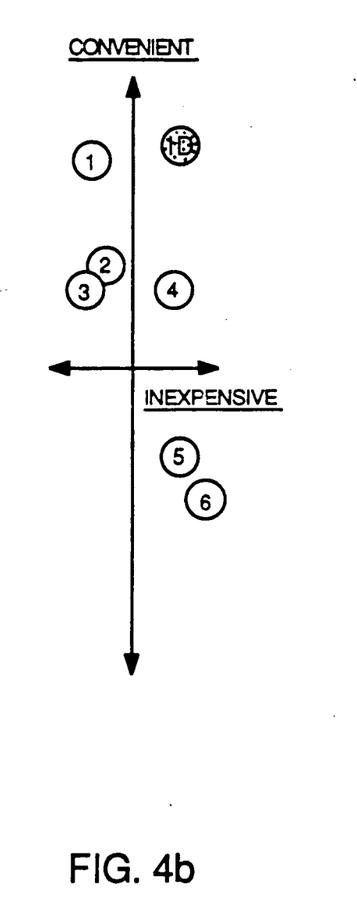

A multidimensional matrix is formed by plotting points representing each item based upon the attribute evaluations associated with each item. The number of dimensions of the matrix is equal to the number of attributes by which the items have been evaluated, which commonly number from 30-50. FIG. 4a shows the position of points representing six automobiles by circles containing the letters "A" through "F" and the ideal by "ID", in two dimensional space defined by the evaluations of the attributes, "convenient" and "inexpensive," for a single consumer. Each point "A" through "F" representing an actual automobile brand is further associated with a subscript identifying its rank, in descending order, of expressed degree of preference. The Euclidean distances between the points representing the ideal "ID" and each item "A" through "F," respectively, are measured and a squeeze analysis of the attributes is performed, iteratively according to St. James' theorem, as depicted in FIG. 4b for the same two attributes shown in FIG. 4a. The attributes are weighted so that the points "A" through "F," which are numbered "1" through "6" in FIG. 4b to reflect their relative likelihoods of being purchased, are realigned so that the Euclidean distances between the ideal point and those points "1" through "6" in FIG. 4b, respectively, from short to long, are ranked in the same order and are proportional to the likelihoods of purchasing each respective item, from greatest to least. The use of only two attributes, or dimensions, in FIGS. 4a and 4b is to enable a representative portion of the multi-dimensional matrix and squeeze analysis to be depicted in a two-dimensional medium. In creating the matrix and performing the squeeze analysis, all attribute evaluations are actually utilized. The values used to weight the attributes to obtain the foregoing relationship between Euclidean distances on the matrix and degrees of likelihood of purchase are recorded as importance weights, each of which is assigned to the respective attribute and reflects the relative contribution of that attribute to the consumers' purchase decision.

Figure 5:
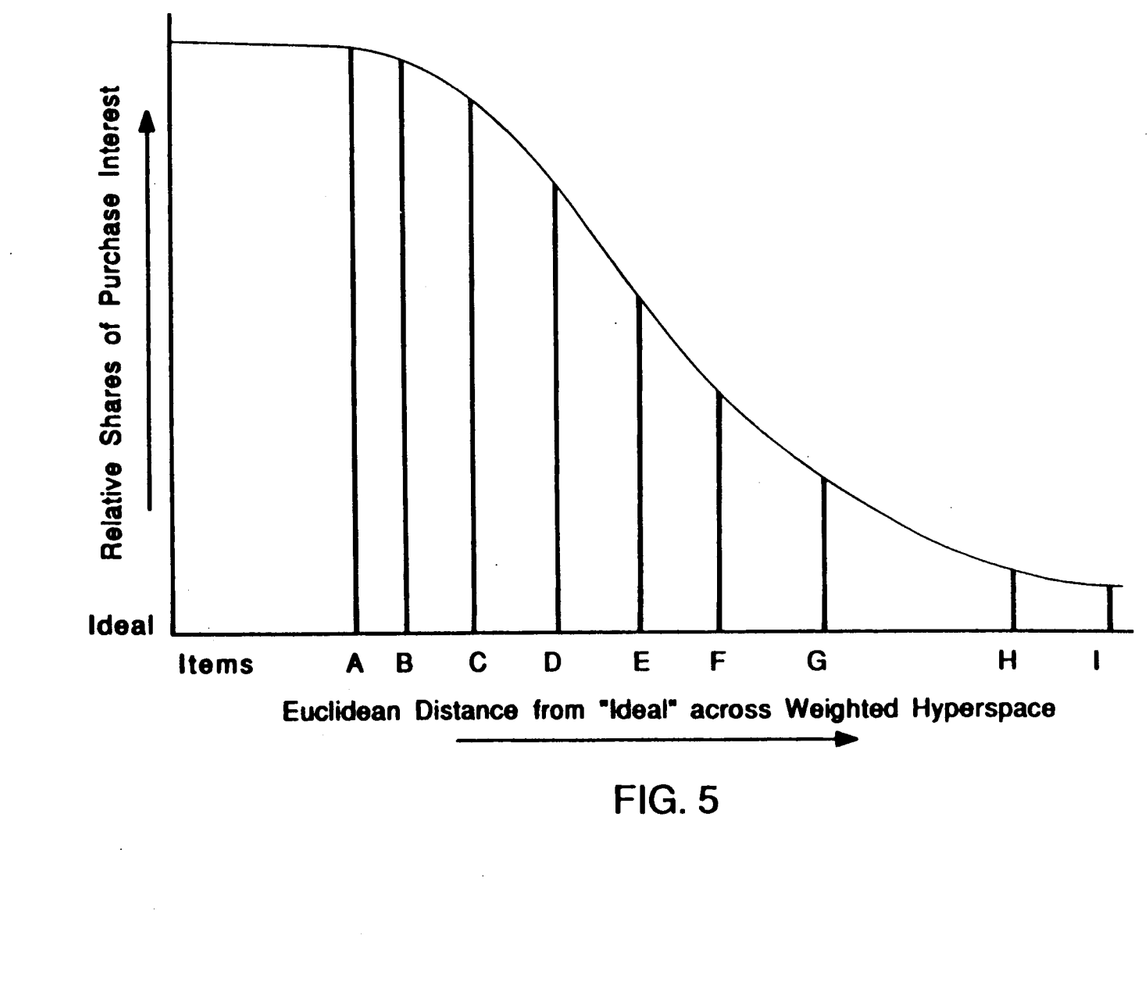
FIG. 5 illustrates a purchase elasticity curve for a consumer.

A purchase elasticity curve is computed for each consumer, as depicted in FIG. 5, which curve is determined by points defined by (i) the relative proportion which the likelihood of purchasing each item bears to the sum of all of such likelihoods for all items, coincident with the vertical axis, and (ii) the Euclidean distances between the points on the squeezed matrix representing each item and the point representing the reference or ideal item for each use, coincident with the horizontal axis. The slope of the portion of the elasticity curve which falls between each point is indicative of the propensity a given change in an attribute evaluation to effect a change in the relative likelihood of purchasing those two items for that consumer. Thus, a propensity weight, which is proportional to the slope of each relevant portion of the elasticity curve for each consumer, is assigned to the attribute evaluations for each consumer used in calculating a change in preference or purchase probability between those items. The propensity weight is subsequently used to modify the attribute evaluations where the potential change in market share with respect to those items bounding the portion of the elasticity curve is sought to be calculated.

A total purchase probability is then calculated for each item by summing the relative proportions of likelihood of purchasing that item for each consumer.

All of the above data can be stored in and evaluated by a computer, preferably the Sandpiper SCRIBE micro-modeling system, also available from Frost International Research. The completion of the foregoing steps enables the creation of a model which simulates the market. Various possibilities in terms of new products and their attributes, and changes in the extent to which existing products possess attributes, can then be modeled and predicted using this system. In this regard, this method can reveal where the largest gap is in the market in terms of heavily importance-weighted attributes which are not represented by the current array of products. It can provide an indication of which attributes, if modified, and how, will provide a new or existing product with an increased preference or likelihood of purchasing and, therefore, market share. It can indicate the greatest single new product opportunity for a manufacturer with products already in that market and can indicate to a manufacturer its vulnerability to each product modification possibly implemented by its competitors. In cross-national marketing research, this method is useful in validating the translation of attributes, not in terms of word meanings, but in terms of replication of results.

These are examples of the utilities of the above-described preferred embodiment of the present invention which can be realized by using the model or data to measure the change in the relative likelihood of purchasing each item which results from a given change in an attribute evaluation for all consumers for a given item. Concomitant changes in other attribute evaluations are calculated on the basis of correlation between the changed attribute evaluation and the concomitantly adjusted attribute evaluations. For example, if the "sporty" evaluation of a Volvo automobile is increased, the "inexpensive" evaluation of the same would be concomitantly decreased in proportion to a negative correlation between "sporty" and "inexpensive." Each of these changes and adjustments are then revalued in proportion to the respective importance weights assigned to each attribute and the respective propensity weights assigned to each consumer's attribute evaluations. All attribute evaluations are then modified in accordance with these revalued changes and adjustments and a resulting new set of relative preferences, or market shares, for each item or the proposed new item is obtained.

The second preferred embodiment of the method of this invention is generally applicable to items which are not directly offered to consumers as finished products. These items, rather, are functionally-related ingredients or parts of consumer products which have different uses. In this described embodiment, the evaluated items are fragrances which are used in an array of consumer products having different uses, including personal deodorants, soaps, detergents, shampoos, medicines, fine fragrances such as perfumes, etc.

In this embodiment, the objective is not only to evaluate fragrances but to provide a perceptual bridge or translation between consumers' attribute evaluations with respect to fragrances, and a tangible reference for the manufacturer to determine what those attribute evaluations, as well as consumers' evaluations of the appropriateness of actual fragrances for use in various consumer products, mean in terms of actual fragrance manufacture and composition.

This tangible reference is in fact a set of reference fragrances corresponding to a set of fragrance notes which would effectively cover the range of fragrances which are appropriate for use in the set of functionally-related products to be evaluated, and which are sufficient for a perfumer to replicate the preparation or composition thereof. These reference frangrances and corresponding notes may number between 20 and 50, depending upon the product class to which the fragrance evaluations relate, and may effectively account for a broad spectrum of fragrances used in household and personal consumer products or fine fragrances. Depending upon the range of products to be included in the survey, its purpose, geographical location and other varying factors, a different set and a different number of reference fragrances may be more appropriately utilized in the fragrance model. The set of reference fragrances is designed by a perfumer or other fragrance expert, for the market researcher, to accomodate the purpose of the particular study and the particular needs of the fragrance maker.

Figure 6:
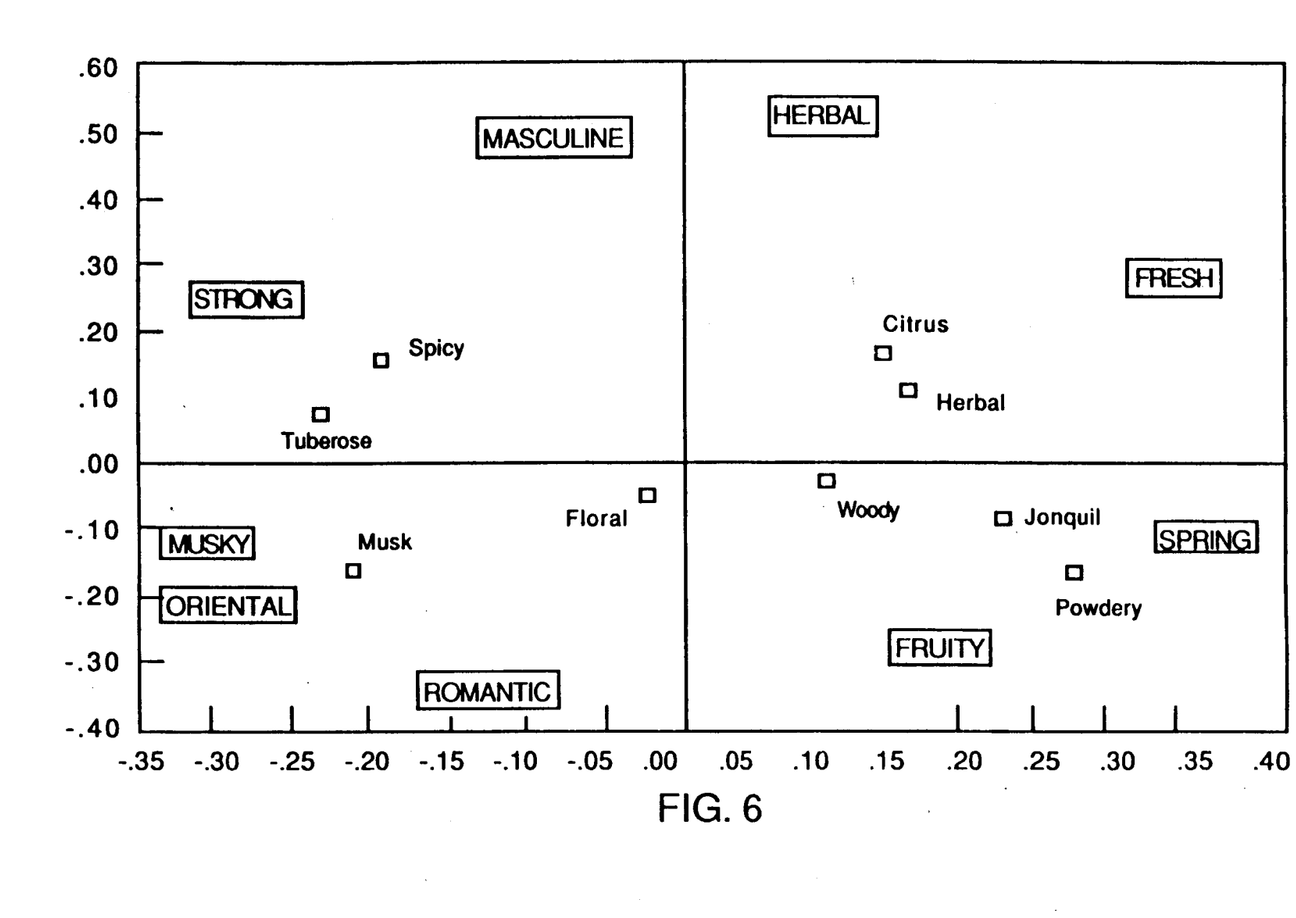
FIG. 6 exemplifies a perceptual map of reference fragrances and the attributes for evaluation of the reference fragrances.

Attributes are elicited from consumers in the same way as in the embodiment previously described herein. The reference fragrances are submitted to consumers in the form of bottles containing substances which emit the particular reference fragrance, which are used as items to elicit descriptors from consumers and to select attributes. Once a set of attributes is selected, evaluations of the extent to which these attributes are attributable to each reference fragrance are elicited from consumers in quantitative interviews, preferably using the SCRIBE computer aided interviewing technique as previously described herein. An example of a perceptual map of reference fragrances and attributes used in evaluating the same is shown in FIG. 6. The reference fragrances are represented by small boxes alongside their corresponding notes and the attributes are shown in large case letters surrounded by rectangular boxes.

Figure 7:
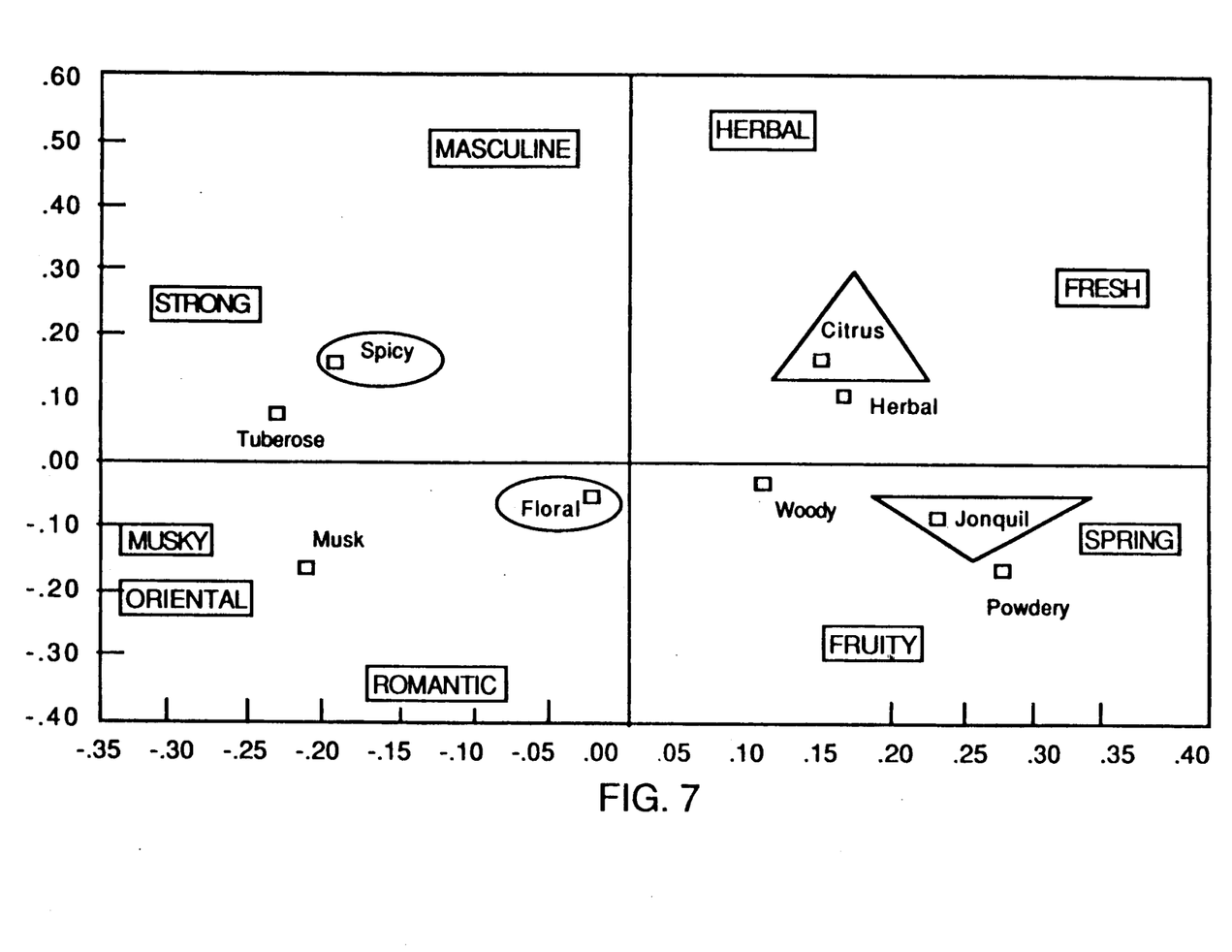
FIG. 7 depicts the perceptual map of FIG. 6 with indications of the appropriateness of reference fragrances for use, for example, in shampoo products.

FIG. 7 shows a reference fragrance map after having been adjusted to reflect the appropriateness of or distribution of preference among the reference fragrances for use, for example, in shampoos. Reference fragrances associated with significant positive consumer preferences are surrounded by darker ovals and lighter ovals, in order of decreasing preference. Those with significantly negative consumer preferences are in triangles.

Further evaluations are elicited from consumers of the degree or extent to which each attribute describes or is otherwise attributable to given fragrances used in related consumer products. Evaluations of preferences for these given fragrances are elicited, and a relative preference for each given fragrance, as associated with a given use, is calculated. This relative preference is the proportion which the preference evaluation for each given fragrance bears to the sum of the preference evaluations for all given fragrances. Changes in the relative preference for each given fragrance, which result from a given percent change in an attribute evaluation for a given fragrance, which resulting change is reflected by the resultant relocation of the point representing each given fragrance on the perceptual map, are measured by the Euclidean distances of those points from the points representing the reference fragrances on the perceptual map and the preference evaluations for the reference fragrances.

A model created in accordance with this invention can be updated or modified over time, and trend data based thereon can be incorporated in the model to predict trends in market shares.

The static validity of methods performed in accordance with this invention is typically demonstrated by a correlation between real market shares of products and the estimated shares based upon the total preference or purchase probability calculated for those products, of over 0.90, as shown in FIG. 8. The dynamic validity is also typically demonstrated by a similar correlation, measured over time, as shown in FIG. 9.

It will be understood that the invention is not limited to the preferred illustrations and embodiments described above, but also encompasses the subject matter delineated by the following claims and all equivalents thereof.

I claim:

1. A method for evaluating consumer response comprising:
    a. conducting interviews of consumers whereby rational, stereotype and personality descriptors of related items are elicited and descriptors, which the interviews indicate are least effective as bases for the consumers to distinguish between the items, are eliminated;
    b. eliciting from consumers evaluations of the extent to which the non-eliminated descriptors are attributable to items;
    c. calculating a discrimination index of the evaluated descriptors whereby the least number of descriptors, which provide the most discrimination between items and which systematically account for the greatest amount of behavioral variance over 70% among the interviewed consumers, are identified as attributes;
    d. eliciting from consumers evaluation of the extent to which attributes are attributable to reference items and to given items for uses associated with the items;
    e. eliciting from consumers evaluations of a degree of preference for given items for uses associated with the given items;
    f. performing an independence factor analysis of the attributes in order to form clusters of related attributes;
    g. creating a multi-dimensional matrix of factors for uses associated with the given items wherein points representing the reference items and the given items are plotted based upon the attribute evaluations associated with the respective item;
    h. determining the effect of a given change in an attribute evaluation for a plurality of consumers for a given item by measuring the relationships among the Euclidean distances between the points representing the items and reference items on the matrix and the degrees of preferences for the given items.

2. A method according to claim 1 which further comprises computing for each consumer a purchase elasticity curve determined by points defined by (i) the relative proportion which the likelihood of purchasing each item identified as a potential purchase bears to the sum of all of such likelihoods for all such items and (ii) the Euclidean distances between the points on the squeezed matrix representing the items identified as potential purchases and the point representing the ideal item.

3. A method according to claim 2 which further comprises determining for each consumer the propensity of a given change in an attribute evaluation to effect a change in the likelihood of purchasing each item relative to the concomitant change in the likelihood of purchasing each other item whereby a propensity weight is assigned to the attribute evaluations for each consumer which weight corresponds to the slope of the portion of the purchase elasticity curve computed for said consumer falling between the points which represent the items for which the propensity to change is being determined.

4. A method according to claim 1 wherein a squeeze analysis of the attributes is performed whereby (i) a matrix is created wherein points representing the Euclidean distances between each item and the ideal item are plotted based upon the attribute evaluations associated with each item and (ii) an importance weight is assigned to each attribute so that the Euclidean distances between the points on the matrix representing each item and the point representing the ideal item are re-ranked into the same order as the likelihoods of purchasing each item.

5. A method according to claim 1 wherein the effect of a given change in an attribute evaluation for all consumers for a given item is further determined by measuring the correlation between attributes and calculating concomitant adjustments in other attribute evaluations in accordance with such correlations.

6. A method according to claim 1 which further comprises creating a perceptual map wherein points representing attributes are plotted with respect to the ability of the respective attributes to provide a basis for consumers to distinguish one reference item from other reference items and points representing reference items are plotted with respect to the attribute evaluations associated with each respective reference item, eliciting from consumers evaluations of the degree of preference for a reference item as associated with a given use, plotting points on the perceptual map representing the given items which points are plotted with respect to the attribute evaluations associated with each given item respectively.

7. A method according to claim 6 which further comprises measuring the change in the relative preference for each given item which results from a given change for all consumers in an attribute evaluation for a given item which change is reflected by the resultant relocation of the point representing the given item on the perceptual map and is measured by the Euclidean distances of that point from the points representing the reference fragrances on the perceptual map.

8. A method according to claim 1 wherein the set of attributes chosen achieve a level of behaviorial variance of about 90% or greater.

9. A method for evaluating consumer response comprising:
   a. eliciting descriptors of related items from consumers including rational, stereotype and personality descriptors;
   b. submitting the descriptors to consumers in qualitative interviews in order to reduce the number thereof by eliminating descriptors which the interviews indicate are insufficient as bases for the consumers to distinguish between the items;
   c. eliciting from consumers evaluations of the extent to which the non-eliminated descriptors are attributable to items;
   d. calculating a discrimination index of the evaluated descriptors whereby descriptors, which provide the most discrimination between items and which systematically account for the greatest amount of behavioral variance over 70% among the interviewed consumers, are identified as attributes;
   e. eliciting from consumers identification of uses which consumers associate with items;
   f. eliciting from consumers evaluations of the extent to which attributes are attributable to items for uses associated with the items;
   g. eliciting from consumers evaluations of the extent to which attributes ideally should be possessed by an item for uses associated with the items;
   h. eliciting from consumers evaluations of the likelihood of purchasing items for uses associated with the items;
   i. eliciting from consumers an identification of which items each consumer would potentially purchase for uses associated with the items;
   j. performing an independence factor analysis of the attributes in order to form clusters of related attributes;
   k. performing with respect to uses identified by consumers in step e a squeeze analysis of the attributes whereby (i) a matrix of factors is created wherein points representing the Euclidean distances between each item and the ideal item are plotted based upon the attribute evaluations associated with each respective item and (ii) an importance weight is assigned to each attribute so that the Euclidean distances between the points on the matrix representing each item and the point representing the ideal item are re-ranked into the same order as the likelihoods of purchasing each item;
   l. computing for each consumer a purchase elasticity curve determined by points defined by (i) the relative proportion which the likelihood of purchasing each item identified as a potential purchase bears to the sum of all of such likelihoods for all such items and (ii) the Euclidean distances between the points on the squeezed matrix representing the items identified as potential purchases and the point representing the ideal item;
   m. determining for each consumer the propensity of a given change in an attribute evaluation to effect a change in the likelihood of purchasing each item relative to the concomitant change in the likelihood of purchasing each other item whereby a propensity weight is assigned to the attribute evaluations for each consumer which weight corresponds to the slope of the portion of the purchase elasticity curve computed for said consumer falling between the points which represent the items for which the propensity to change is being determined;
   n. calculating a purchase probability for each item by summing the relative proportions computed for each item for all consumers in step l(i);
   o. measuring the change in the purchase probability for each item which results from a given change in an attribute evaluation for all consumers for a given item by (i) calculating for each consumer the concomitant adjustments in other attribute evaluations in proportion to the degree to which said other attribute evaluations respectively correlate to the changed attribute evaluation, (ii) re-valuing these changes and adjustments in proportion to the importance weights and propensity weights, assigned to each attribute evaluation, respectively, and (iii) summing for all consumers the re-valued changes and adjustments associated with each item.

10. A method for evaluating consumer response comprising:
   a. eliciting descriptors of functionally-related items from consumers including rational, stereotype and personality descriptors;
   b. submitting the descriptors to consumers in qualitative interviews in order to reduce the number thereof by eliminating descriptors which the interviews indicate are insufficient as bases for the consumers to distinguish between the items;
   c. eliciting from consumers evaluations of the extent to which the non-eliminated descriptors are attributable to each item;
   d. calculating a discrimination index of the evaluated descriptors whereby descriptors, which provide the most discrimination between items and which account for a level of behavioral variance of about 90% or greater among the interviewed consumers, are identified as attributes;
   e. eliciting from consumers identification of the uses which consumers associate with items;
   f. eliciting from consumers evaluations of the extent to which each attribute is attributable to each item for each use identified by consumers in step e;
   g. eliciting from consumers evaluations of the extent to which each attribute ideally should be possessed by an item when used for a use identified by consumers in step e;
   h. eliciting from consumers evaluations of the likelihood of purchasing each of the items for each use identified by consumers in step e;

i. eliciting from consumers an identification of which items each consumer would potentially purchase for each use identified in step e;

j. performing an independence factor analysis of the attributes in order to form clusters of related attributes;

k. performing with respect to each use identified by consumers in step e a squeeze analysis of the attributes whereby (i) a matrix of factors is created wherein points representing the Euclidean distances between each item and the ideal item are plotted based upon the attribute evaluations associated with each respective item and (ii) an importance weight is assigned to each attribute so that the Euclidean distances between the points on the matrix representing each item and the point representing the ideal item are re-ranked into the same order as the likelihoods of purchasing each item;

l. computing for each consumer a purchase elasticity curve determined by points defined by (i) the relative proportion which the likelihood of purchasing each item identified as a potential purchase bears to the sum of all of such likelihoods for all such items and (ii) the Euclidean distances between the points on the squeezed matrix representing the items identified as potential purchases and the point representing the ideal item;

m. determining for each consumer the propensity of a given change in an attribute evaluation to effect a change in the likelihood of purchasing each item relative to the concomitant change in the likelihood of purchasing each other item whereby a propensity weight is assigned to the attribute evaluations for each consumer which weight corresponds to the slope of the portion of the purchase elasticity curve computed for said consumer falling between the points which represent the items for which the propensity to change is being determined;

n. calculating a purchase probability for each item by summing the relative proportions computed for each item for all consumers in step l(i);

o. measuring the change in the purchase probability for each item which results from a given percent change for each consumer in an importance weight for a given attribute by (i) calculating concomitant adjustments in the importance weights associated with other attributes in proportion to the degree to which the attributes associated with the adjusted importance weights respectively correlate with the attribute associated with the changed importance weight, (ii) revaluing for each consumer the Euclidean distances calculated in step k in proportion to the respective importance weights using the adjustments calculated in step o(i), (iii) calculating new preference evaluations on the basis of the respective revalued Euclidean distances and (iv) summing the new preference evaluations for each item.

11. A method for measuring and evaluating consumer response for the development of consumer products comprising:

a. eliciting from consumers in qualitative open-ended interviews descriptors of related items including rational, stereotype and personality descriptors;

b. including the descriptors in questionnaires and submitting said questionnaires to consumers in qualitative interviews whereby the number of descriptors is reduced by eliminating from consideration descriptors which the responses to such interviews indicate are insufficient as bases for the consumers to distinguish between the items;

c. eliciting from consumers in quantitative interviews evaluation of the extent to which the non-eliminated descriptors are attributable to each item;

d. performing a discriminant analysis of the evaluated descriptors whereby a discrimination index of the evaluated descriptors is calculated and whereby descriptors, which provide the most discrimination between items and systematically account for the greatest amount of behavioral variance over 70% among the interviewed consumers, are identified as attributes;

e. eliciting from consumers using questionnaires in qualitative interviews identification of uses which consumers associate with items;

f. eliciting from consumers using questionnaires in quantitative interviews evaluations of the extent to which each attribute is attributable to each item for uses associated with the items;

g. eliciting from consumers using questionnaires in quantitative interviews attribute evaluations of the extent to which each attribute ideally should be possessed by an item for uses associated with the items;

h. eliciting from consumers evaluation of purchase interest, for each item when used for uses associated with the items, using questionnaires in quantitative interviews;

i. eliciting from consumers using questionnaires in qualitative interviews identification of potential purchases for uses associated with the items;

j. performing an independence factor analysis of the attributes whereby clusters of related attributes are formed;

k. performing with respect to each use associated with the itemsy a squeeze analysis, iteratively according to St. James Theorum, of the attributes whereby (i) a matrix is created wherein points representing each item and the ideal item are plotted based upon the attribute evaluations associated with each respective item and (ii) an importance weight is assigned to each attribute by adjusting the scale used to measure each attribute evaluation in the matrix which adjustment relocates the position of each point on the matrix to obtain the closest fit of the Euclidean distances between the points on the matrix representing each item and the point representing the ideal item to the purchase interest for the respective item;

l. computing for the evaluations elicited from each consumer a purchase elasticity curve defined by points on a graph which are plotted with respect to the relative proportions which the purchase interest for each potential purchase bears to the sum of purchase interests for all potential purchases on the vertical axis and the Euclidean distances between the points on the squeezed matrix representing each potential purchase and the point representing the ideal item on the horizontal axis;

m. calculating a purchase probability for each item by summing among consumers the proportions of purchase interest associated with each item as a potential purchase;

n. determining the propensity of a given change in an attribute evaluation to effect a change in the purchase interest associated with each potential purchase relative to the concomitant change in the purchase interest associated, with each other potential purchase, respectively, whereby a propensity weight is assigned to the attribute evaluation for each consumer which corresponds to slope of the portion of the purchase elasticity curve computed with respect to said consumer falling between the two points on said curve which represent the potential purchase with respect to which the propensity to change is being determined.

o. measuring the change in the purchase probability for each item which results from a given percent change for all consumers in an attribute evaluation for a given item whereby (i) concomitant percent adjustments in other attribute evaluations are for each consumer calculated in proportion to the degree to which said attribute evaluations respectively correlate to the changed attribute evaluation, (ii) said changes and adjustments are modified in accordance with the importance weights and propensity weights assigned to each attribute evaluation respectively and (iii) the modified changes and adjustments associated with each item are summed for all consumers.

12. A method for measuring and evaluating consumer response for the development of consumer products comprising:

a. eliciting from consumers in qualitative open-ended interviews descriptors of related items including rational, stereotype and personality descriptors;
   b. including the descriptors in questionnaires and submitting said questionnaires to consumers in qualitative interviews whereby the number of descriptors is reduced by eliminating from consideration descriptors which the responses to such interviews indicate are insufficient as bases for the consumers to distinguish between the items;
   c. eliciting from consumers in quantitative interviews evaluation of the extent to which the non-eliminated descriptors are attributable to each item;
   d. performing a discriminant analysis of the evaluated descriptors whereby a discrimination index of the evaluated descriptors is calculated and whereby descriptors, which provide the most discrimination between items and which account for a level of behavioral variance of about 90% or greater among the interviewed consumers, are identified as attributes;
   e. eliciting from consumers using questionnaires in qualitative interviews identification of uses which consumers associate with items;
   f. eliciting from consumers using questionnaires in quantitative interviews evaluations of the extent to which each attribute is attributable to each item when used for a use identified by consumers in step e;
   g. eliciting from consumers using questionnaires in quantitative interviews attribute evaluations of the extent to which each attribute ideally should be possessed by an item when used for a use identified by consumers in step e;
   h. eliciting from consumers evaluation of purchase interest, for each item when used for a use identified in step e, using questionnaires in quantitative interviews;
   i. eliciting from consumers using questionnaires in qualitative interviews identification of potential purchases for each use identified in step e;
   j. performing an independence factor analysis of the attributes whereby clusters of related attributes are formed;
   k. performing with respect to each use identified by consumers in step e a squeeze analysis, iteratively according to St. James Theorum, of the attributes whereby (i) a matrix of factors is created wherein points representing each item and the ideal item are plotted based upon the attribute evaluations associated with each respective item and (ii) an importance weight is assigned to each attribute by adjusting the scale used to measure each attribute evaluation in the matrix which adjustment relocates the position of each point on the matrix to obtain the closest fit of the Euclidean distances between the points on the matrix representing each item and the point representing the ideal item to the purchase interest for the respective item;
   l. computing for the evaluations elicited from each consumer a purchase elasticity curve defined by points on a graph which are plotted with respect to the relative proportions which the purchase interest for each potential purchase bears to the sum of purchase interests for all potential purchases on the vertical axis and the Euclidean distances between the points on the squeezed matrix representing each potential purchase and the point representing the ideal item on the horizontal axis;
   m. calculating a purchase probability for each item by summing among consumers the proportions of purchase interest associated with each item as a potential purchase;
   n. determining the propensity of a given change in an attribute evaluation to effect a change in the purchase interest associated with each potential purchase relative to the concomitant change in the purchase interest associated with each other potential purchase, respectively, whereby a propensity weight is assigned to the attribute evaluation for each consumer which corresponds to slope of the portion of the purchase elasticity curve computed with respect to said consumer falling between the two points on said curve which represent the potential purchase with respect to which the propensity to change is being determined;
   o. measuring the change in the purchase probability for each item which results from a given percent change for each consumer in an importance weight for a given attribute by (i) calculating concomitant adjustments in the importance weights associated with other attributes in proportion to the degree to which the attributes associated with the adjusted importance weights respectively correlate with the attribute associated with the changed importance weight, (ii) revaluing for each consumer the Euclidean distances calculated in step k in proportion to the respective importance weights using the adjustments calculated in step o(i), (iii) calculating new preference evaluations on the basis of the respective revalued Euclidean distances and (iv) summing the new preference evaluations for each item.

13. A method for the development of consumer products comprising:

a. creating or obtaining a set of fragrance notes sufficient for a perfumer to identify and distinguish between fragrances on the basis of preparation and composition thereof;
b. identifying a set of reference fragrances corresponding to the fragrance notes;
c. conducting interviews of consumers whereby rational, stereotype and personality descriptors of the reference fragrances are elicited and descriptors which the interviews indicate are insufficient as bases to distinguish between reference fragrances are eliminated;
d. eliciting from consumers evaluations of the extent to which the non-eliminated descriptors are attributable to reference fragrances;
e. calculating a discrimination index of the evaluated descriptors whereby descriptors, which provide the most discrimination between reference fragrances and which systematically account for the greatest amount of behavioral variance over 70% among the interviewed consumers, are identified as attributes;
f. eliciting from consumers evaluations of the extent to which attributes are attributable to reference fragrances;
g. creating a perceptual map wherein points representing attributes are plotted with respect to the ability of the respective attributes to provide a basis for consumers to distinguish one reference fragrance from other reference fragrances and points representing reference fragrances are plotted with respect to the attribute evaluations associated with each respective reference fragrance;
h. eliciting from consumers evaluation of the degree of preference for a reference fragrance as associated with a use;
i. eliciting from consumers evaluations of the extent to which attributes are attributable to given fragrances;
j. performing an independence factor analysis of the attributes in order to form clusters of related attributes;
k. plotting points on the perceptual map created in step h representing the given fragrances which points are plotted with respect to the attribute evaluations associated with each given fragrance respectively;
l. eliciting from consumers evaluations of the degree of preference for a given fragrance as associated with a given use;
m. calculating a relative preference for each given fragrance as associated with a given use which corresponds to the proportion which the preference evaluation for each given fragrance bears to the sum of preference evaluations for all given fragrances;
n. measuring the change in the relative preference for each given fragrance which results from a given change for all consumers in an attribute evaluation for a given fragrance which resulting change is reflected by the resultant relocation of the point representing the given fragrance on the perceptual map and is measured by the Euclidean distances of that point from the points representing the reference fragrances on the perceptual map.

14. A method according to claim 13 wherein the attributes achieve a level of behavioral variance of about 90% or greater.

* * * * *